United States Patent [19]

Millis et al.

[11] Patent Number: 5,286,506
[45] Date of Patent: Feb. 15, 1994

[54] INHIBITION OF FOOD PATHOGENS BY HOP ACIDS

[75] Inventors: James R. Millis, Kohler; Mark J. Schendel, Manitowoc, both of Wis.

[73] Assignee: Bio-Technical Resources, Manitowoc, Wis.

[21] Appl. No.: 969,698

[22] Filed: Oct. 29, 1992

[51] Int. Cl.$^5$ .......................................... A23L 3/3508
[52] U.S. Cl. .................................... 426/335; 426/532
[58] Field of Search ................................ 426/335, 532

[56] References Cited

U.S. PATENT DOCUMENTS 2,550,255 4/1951 Jensen ............................ 426/335 X

OTHER PUBLICATIONS

Banwart, Basic Food Microbiology, 1981, AVi Westport, Connecticut, p. 100.
S. Velani & R. J. Gilbert, "Listeria Monocytogenes in Prepacked Ready-to-Eat Sliced Meats," PHLS Microbiology Digest vol. 7 (1990).
Teuber & Schmalrek, Arch. Mikrobiol. 94 (1973), pp. 159–171.

*Primary Examiner*—Joseph Golian
*Attorney, Agent, or Firm*—Frank C. Hilberg, Jr.

[57] ABSTRACT

The protection of food products from contamination by food pathogens, particularly Listeria monocytogenes, by incorporation of 6 to 50 ppm and preferably 6 to 15 ppm of beta-acids, as extracted from hops, into such food products.

7 Claims, No Drawings

INHIBITION OF FOOD PATHOGENS BY HOP ACIDS

BACKGROUND OF THE INVENTION

The present invention relates to the use of beta-acids as extracted from hops for controlling Listeria and other food pathogens in food products intended for human consumption.

Recent studies have revealed that listeriosis in humans as caused by Listeria species and particularly Listeria monocytogenes is associated with the consumption of various types of foods, particularly soft cheese and pate as well as hams and other prepacked meat and poultry products. "Listeria Monocytogenes in Prepacked Ready-To-Eat Sliced Meats", a survey by the 16 public health laboratories in the PHLS food chain, by S. Velani and R. J. Gilbert, PHLS Microbiology Digest Vol. 7 (1990).

Hops and their associated acids have long been recognized as bacteriological inhibitors. More specifically, hop acids and resins have been shown to be primarily active against gram positive bacteria, e.g., Bacilli, Corynebacteria, Diplococci, Mycobacteria, Streptococci, Lactobacilli and Streptomyces. Most of the publications have focused on Lactobacilli, since this organism is a major contaminant in beer fermentation. Activity against gram negative bacteria is far less pronounced. Teuber and Schmalrek (Arch. Mikrobiol. 94, pp. 159–171, 1973) and Simpson and Hammond (European Brewery Convention, 1991) have suggested that the effect was due to induced permeability of the cell membrane in gram positive bacteria, but was inactivated by serumphosphatides in gram negative bacteria.

SUMMARY OF THE INVENTION

The present invention relates to the discovery that of the bitter acids contained in hops the beta-acids are useful as a bacteriocide against a dangerous food pathogen (Listeria) at levels below that at which a noticeable flavor from the beta-acids is detectable.

DETAILED DESCRIPTION

One of the historical roles of hops in beer making, namely the bacteriostatic function, has been made obsolete in the modern manufacture of beer by aseptic fermentation and packaging. The bitter acids component of the hops and particularly the beta-acids have now been found to be unexpectedly useful as bacteriocides in food products. The most prevalent groups of bitter acids found as components of hops are the alpha-acids and the beta-acids, also referred to as humulones and lupulones, respectively. Both contribute bitterness to beer, but the alpha-acids are much more intense in this regard than the beta-acids. Producers of hop extracts have thus recently developed a technique to separate the two acid fractions using liquid carbon dioxide under supercritical conditions. A by-product of the operation is a product which contains approximately 61 weight percent beta-acids, the remainder consisting essentially of hop resins.

The alpha-acids contained in hops have the structure:

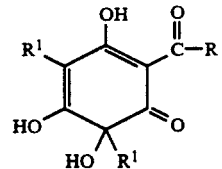

| | R | $R^1$ |
|---|---|---|
| Humulone | —$CH_2CH(CH_3)_2$ | |
| Cohumulone | —$CH(CH_3)_2$ | —$CH_2$—$CH$=$C(CH_3)_2$ |
| Adhumulone | —$CH(CH_3)CH_2CH_3$ | |

The alpha-acids form a precipitate with lead acetate. The beta-acids contained in hops have the structure:

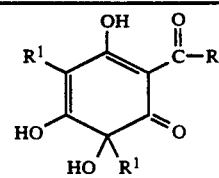

| | R | $R^1$ |
|---|---|---|
| Lupulone | —$CH_2CH(CH_3)_2$ | |
| Colupulone | —$CH(CH_3)_2$ | —$CH_2$—$CH$=$C(CH_3)_2$ |
| Adlupulone | —$CH(CH_3)CH_2CH_3$ | |

The beta-acids do not form a precipitate with lead acetate.

The beta-acids used herein are virtually insoluble in aqueous solutions at pH 5.2 and below, but are readily soluble above pH 7. Thus, the beta-acids are normally applied to the food being treated as an aqueous solution at pH 7 to 9.5. Generally the aqueous solution contains from 6 to 100 ppm beta acids with from 15 to 50 ppm being the preferred range. The aqueous solution of beta acids is applied to the food product being treated as a spray or the food product can be dipped in the solution of beta acids, prior to storage.

Hops are added to the wort during the brewing process at a rate of 1 to 8 grams per liter, depending on the fermentation process being used and the hop variety. Hops generally contain from 2 to 12 wt. % alpha-acids and 1 to 10 wt. % beta-acids. Thus the beta-acid content of the wort is from 0.001 to 0.08 wt. % (10 to 800 ppm) beta-acids. For use herein generally the beta-acids are extracted to provide a product containing 50 to 80 wt. % beta-acids, which is diluted or concentrated to provide the desired aqueous solution.

The present invention relates to the discovery that the carbon dioxide extract fraction which is rich in beta-acids is useful as a food preservative. The present invention targets the food pathogen Listeria monocytogenes. This pathogen is responsible for approximately 70 deaths per year, more than twice the number from any other food pathogen. It is generally believed that the predominant source of Listeria contamination is the food manufacturer. These facts have led to an intense search for new techniques to detect and inhibit Listeria.

It has now been found that the growth of Listeria monocytogenes is completely inhibited in liquid culture at a concentration of 6 parts per million (ppm) beta-acids. Our experiments indicate the effect to be bacteriostatic. We have also noted growth inhibition by beta-acids with respect to *Salmonella enteritidis*, *Staphylococcus aureus* and *Clostridium perfringes*. No growth inhibitions by beta-acids have been found with respect to *Campylobactu sputorum bubulus*, *Saccharomyces cerevisieac*, *Aspergillus niger*, *Candida tropicalis*, Geotrichum sp., *Penicillium griseofulvum*, and *Fusarium tricintum*.

Taste evaluations indicate that purified beta-acids impart a noticeable flavor above 15 ppm, and an objectionable flavor above 50 ppm. Thus the beta-acids are generally applied to the food to be protected from contamination with Listeria monocytogenes at the level of 6 ppm to 50 ppm with from 6 ppm to 15 ppm being the preferred range, (as based on the weight of the food).

Foods most likely to be contaminated with Listeria are solid foods which include cheese, particularly soft cheese, seafood, processed meats including hot dogs, sausages, hams, turkey and chicken.

EXAMPLES

Example 1

A 1.0 g sample of beta-acid fraction is weighed and placed in a large test tube. The beta-acid fraction was a commercial product obtained from Rohm and Haas & Company believed to be obtained by liquid carbon dioxide extraction of hops under super critical conditions. The beta-acid fraction contains 61% beta-acids and the remainder is essentially hop resins. Five ml of hexane is added to the test tube and the contents of the test tube vortexed until the beta-acids are dissolved.

Fifteen ml of 1M aqueous NaOH is added to the test tube, and the contents of the text tube vortexed well. The alkaline aqueous phase is removed by decantation and saved. Another fifteen ml aliquot of 1M aqueous NaOH is added to the test tube, and the contents of the test tube vortexed well. The alkaline aqueous phase is removed by decantation and combined with the alkaline aqueous phase saved above. The combined alkaline aqueous phase material is acidified to about pH 1 with concentrated hydrochloric acid. The acidified aqueous is then extracted three times with 125 ml aliquots of petroleum ether using a separatory funnel. The solution of beta-acids is dried over sodium sulfate at 23°–24° C., then evaporated in a laboratory Roto-Vac® at 45° C. to remove excess ether until only an oily residue remains. The oil is placed in a freezer at $-20°$ C. Crystals form which are isolated by filtration, then recrystallized from ether at $-20°$ C. The beta-acids are stored in the freezer until used.

Example 2

A plurality of test tubes are charged with 5 ml of brain-heart broth (B-H broth). Tubes are inoculated with 100 microliters of a culture of Listeria that had been grown overnight in brain-heart broth. A solution of beta-acids, as prepared in Example 1, is added to each test tube to provide the beta-acid concentration reported in Table I below. Another set of test tubes containing brain-heart broth and beta-acids in concentrations is prepared corresponding to those prepared above. These later tubes were not inoculated with Listeria. All of the tubes are incubated together at 35° C. for 24 hours.

TABLE I

| Beta-Acids (ppm) | 0 | 1 | 3 | 5 | 7 | 10 | 12 | 15 | 25 | 50 | 75 |
|---|---|---|---|---|---|---|---|---|---|---|---|
| 50 ppm Beta Acids (ml) | — | 0.04 | 0.12 | 0.2 | 0.28 | 0.4 | 0.48 | 0.06 | 1.0 | 2.0 | 3.0 |
| H$_2$O (ml) | 5 | 4.96 | 4.88 | — | 4.72 | 4.6 | 4.52 | 4.4 | 4.0 | 3.0 | 2.0 |
| B-H Broth (ml) | 5 | 5 | 5 | 5 | 5 | 5 | 5 | 5 | 5 | 5 | 5 |
| O.D. 620 nm (1) | 0.47 | 0.21 | 0.125 | 0 | 0.005 | 0 | 0.007 | 0 | 0.001 | 0.005 | 0.001 |
| O.D. 620 nm (2) | 0.44 | 0.22 | 0.125 | 0.03 | 0.005 | 0.005 | 0 | 0 | 0 | 0 | 0.005 |
| O.D. 620 nm (3) | 0.48 | 0.22 | 0.085 | 0.005 | 0.005 | 0.01 | 0.005 | 0.005 | 0 | 0 | 0.01 |
| NG/Growth | — | Lawn | Lawn | 210 col | TNTC | 4 col | 20 col | 23 col | 1 col | 11 col | 3 col |
| 620 nm | 0.46 | 0.22 | 0.11 | 0.01 | 0.005 | 0.005 | 0.004 | 0.002 | 0.0 | 0.005 | 0.005 |

As can be seen from the above the beta-acids posses bacteriostatic activity which is effective against Listeria at levels of about 5 ppm and above.

In Table I the "NG/Growth" row reports values for plate counts, or the number of live colonies per ml of medium. Notations for "lawn" or "TNTC" indicate more than 300 colonies per ml.

EXAMPLE 3

A solution containing 100 ppm beta-acids is prepared as follows:

Ten mg of the beta-acid solution from Example 1 is charged into a 45 ml sterile test tube. Ten ml of 95% ethyl alcohol is added to test tube to dissolve the beta-acids. The resulting solution is added to a 100 ml volumetric flask. The contents of the flask are brought up to total 100 ml with 8.5 pH Mueller Hinton Broth. The resulting solution is filtered under sterile conditions using a filter having a 0.45 U in pore size. Thirty eight and four tenths ml of the filtered beta-acid solution and 1.6 ml of Mueller Hinton Broth is added to a sterile 125 ml shake flask fitted a stir bar. Twenty ml of Mueller Hinton Broth are added to each of 18 50 ml test tubes, along with enough of the above prepared beta-acid solution to bring the beta-acid level to that reported in Table II. When all the test tubes are filled, 2.5 ml is removed from each tube to record pH. Nine of the test tubes are inoculated with 25 Ul Listerium Mueller Hinton Broth (6N). All 18 test tubes are incubated at 35° C. for 24 hours. The O.D. (600 nm) and the pH are recorded after the 24 hour incubation period. The results are reported in Table II.

TABLE II

| Beta-Acids (ppm) | 96 | 48 | 24 | 12 | 6 | 3 | 1.5 | 0.75 | 0 |
|---|---|---|---|---|---|---|---|---|---|
| pH (start) | 8.32 | 7.84 | 7.53 | 7.36 | 7.26 | 7.22 | 7.20 | 7.18 | 7.20 |
| pH (after 24 hrs) | 8.25 | 7.82 | 7.35 | 7.35 | 7.25 | 7.05 | 6.93 | 6.93 | 6.62 |
| O.D. (24 hrs) | 0.003 | 0.006 | 0.002 | 0.008 | 0.008 | 0.114 | 0.19 | 0.383 | 0.820 |

Example 4

A solution containing 100 ppm beta-acids is prepared as follows:

Ten mg of the beta-acid solution from Example 1 is charged into a 45 ml sterile test tube. Ten ml of 95% ethyl alcohol is added to the test tube to dissolve the beta-acids. The resulting solution is added to a 100 ml volumetric flask. The contents of the flask are brought up to total 100 ml with pH 8.5 Mueller Hinton Broth. The resulting solution is filtered under sterile conditions using a filter having a 0.45 Um pore size. Thirty eight and four tenths ml of the filtered beta-acid solution and 1.6 ml of brain-heart broth is added to a sterile 125 ml shake flask fitted with a stir bar. Twenty ml of brain-heart broth are added to each of 18 50 ml test tubes, along with enough of the above-prepared beta-acid solution to bring the beta-acid level to that reported in Table III. When all the test tubes are filled, 2.5 mil is removed from each tube to record pH. Nine of the test tubes are inoculated with 25 Ul Listeria in brain-heart broth (6N). All 18 test tubes are inoculated at 35° C. for 24 hours. The O.D. (600 nm) and the pH are recorded after the 24 hour incubation period. The results are reported in Table III.

TABLE III

| Beta-Acids (ppm) | 96 | 48 | 24 | 12 | 6 | 3 | 1.5 | 0.75 | 0 |
|---|---|---|---|---|---|---|---|---|---|
| pH (start) | 8.35 | 7.76 | 7.54 | 7.45 | 7.41 | 7.39 | 7.38 | 7.38 | 7.37 |
| pH (after 24 hrs) | 8.24 | 7.75 | 7.54 | 7.45 | 7.41 | 7.17 | 6.08 | 5.92 | 5.79 |
| O.D. (24 hrs) | 0.0 | 0.00 | 0.007 | 0.004 | 0.0 | 0.153 | 0.482 | 0.808 | 1.092 |

In the above examples the O.D. is taken at 600 nm using 2.5 ml of well mixed broth in disposable cavettes.

The results indicate that the beta-acids prevent the growth of Listeria down to 6 ppm for both the Mueller Hinton and Brain Heart broths.

The pH is affected by the concentration of beta-acids, but remains in the growth range for Listeria. So this should not be responsible for the growth inhibition of Listeria observed herein.

We claim:

1. A process comprising applying a solution containing 6 to 100 ppm beta-acids as extracted from hops to a solid food product to incorporate from 6 to 50 ppm beta-acids in said food product to prevent growth of Listeria in said food product.

2. The process of claim 1 wherein the solution of beta-acids is applied to the food product by dipping the food product in the solution of beta acids.

3. The process of claim 2 wherein from 6 to 15 ppm beta-acids are incorporated into the food product.

4. The process of claim 1 wherein the solution of beta-acids is applied to the food product by spraying the solution of beta-acids onto the food product.

5. The process of claim 4 wherein from 6 to 15 ppm beta-acids are incorporated into the food product.

6. A packaged solid food product containing from 6 to 50 ppm beta-acids as extracted from hops to prevent growth of Listeria therein.

7. The food product of claim 6 wherein the food product contains from 6 to 15 ppm beta-acids.

* * * * *